(No Model.)
J. E. SINCLAIR.
PUMP.
No. 306,113. Patented Oct. 7, 1884.
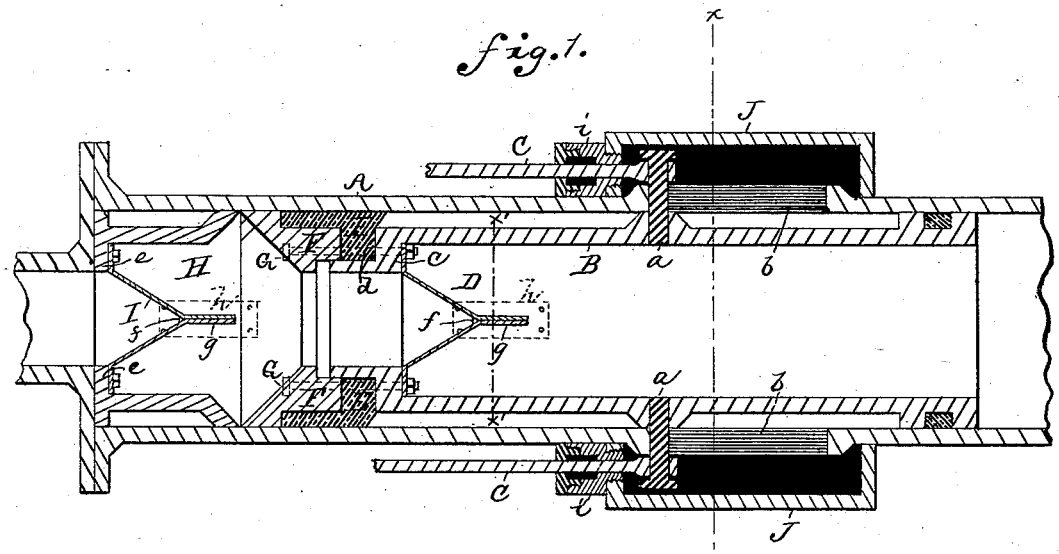
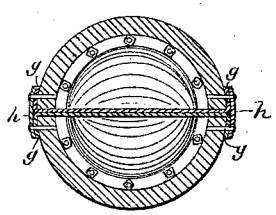
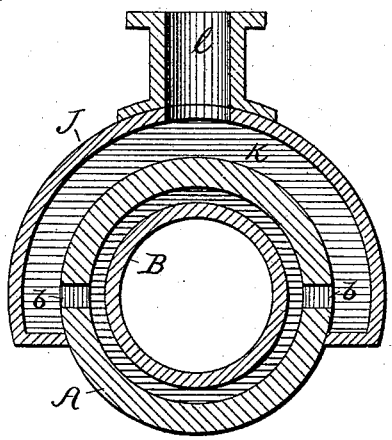
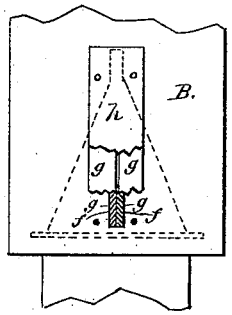
WITNESSES:
H. B. Brown
A. G. Lyne
INVENTOR:
James E. Sinclair
BY Munn & Co
ATTORNEYS.

UNITED STATES PATENT OFFICE.

JAMES E. SINCLAIR, OF WAVERLY, MARYLAND.

PUMP.

SPECIFICATION forming part of Letters Patent No. 306,113, dated October 7, 1884.

Application filed September 11, 1883. (No model.)

*To all whom it may concern:*

Be it known that I, JAMES EDWARD SINCLAIR, of Waverly, Baltimore county, in the State of Maryland, have invented a new and useful Improvement in Pumps, of which the following is a full, clear, and exact description, reference being had to the annexed drawings, forming part of this specification.

This invention relates to an improved pump, in which the water-cylinder is combined with a hood arranged on the outside of the casing for collecting escaping gases, whereby they may be destroyed to prevent the spreading of noxious odors; and the invention consists of the novel construction hereinafter described and claimed.

In the drawings, Figure 1 is a longitudinal section of the pump, and Fig. 2 is a cross-section of the same, taken on line $x\,x$ of Fig. 1. Fig. 3 is a cross-section of cylinder B on line $x'\,x'$ of Fig. 1, and Fig. 4 is a side elevation of said cylinder, partly broken away.

A indicates the outer cylindrical shell or casing of the pump, and B is the water-cylinder, having studs $a$, adapted to move in the slots $b$ in the casing, which studs form a means of connection through the rods C with the forked lever, (not shown,) by which the water-cylinder is to be reciprocated. One end of the water-cylinder B is formed with an internal annular shoulder, $c$, for supporting and shielding the valve D, and an external annular shoulder, $d$, for the packing E and packing-ring F. The packing-ring, which may either screw on the cylinder B or be secured thereto by bolts G, is beveled outwardly on its inner surface toward the stationary valve-cylinder H, which latter is made flaring at the end adjacent to cylinder B. The object of this construction is to prevent sand or other substance from being caught between the cylinder H and ring F. The cylinder H is likewise provided with an internal annular shoulder, $e$, for the stationary valve I.

The valves D and I, which are identical in construction, are each formed of two pieces of canvas, rubber, or other flexible material secured at the edges to the cylinder B, as shown in Patent No. 279,451, granted to me June 12, 1883. In the present instance I modify the attachment of the valve to its cylinder by forming the cylinder with one or more longitudinal slots, $f$, in each of two opposite sides, instead of forming the cylinder in two longitudinal sections, and secure the edges of the valve material $g$ in said slots by means of plates $h$, which are bolted to the outer sides of the cylinders B H, to clamp and hold said edges, and at the same time to close the slots.

In pumping out sinks it is important to prevent the escape of offensive gases into the air.

In order to collect and burn the gases which may escape around the packing of the pump and pass out through the slots $b$ in the casing, I provide a hood, J, which incloses the upper part of the casing, including the slots $b$, and is provided with packing-boxes $i$ for the rods C. The hood is thus of a semi-cylindrical form in cross-section, forming with the casing A a chamber, $k$, leading from the slots $b$ to a burner to be located in an opening, $l$, at the top of the hood. The gases thus collected may be burned on the hood or conveyed away by suitable connections with the opening at the top of the hood to be burned elsewhere.

What I claim is—

1. The water-cylinder B, having shoulder $c$ and slots $f$ in opposite sides, in combination with the rubber valve-sections $g\,g$, having their side edges inserted through said slots and secured by plates $h$, and their base edges secured to said shoulder, substantially as shown and described.

2. The combination of the movable water-cylinder B, having a valve therein and a beveled packing-ring, F, the stationary cylinder H, having a valve therein and a bevel corresponding to the bevel of the said ring, and the outer casing, A, substantially as shown and described.

3. The combination, with the outer casing and the water-cylinder, of the hood J, forming chamber $k$ with the said casing, and having an opening for burning or conveying away the gases collected in the hood, substantially as shown and described.

JAMES E. SINCLAIR.

Witnesses:
WM. D. WRIGHT,
L. WM. RAHE.